United States Patent Office 3,253,952
Patented May 31, 1966

3,253,952
INSULATED ELECTRICAL MEMBERS AND
PROCESS FOR PRODUCING THE SAME
Jack D. Merry, East Syracuse, N.Y., and Charles H. Vondracek, Wilkins Township, Allegheny County, Pa., assignors to Westinghouse Electric Corporation, Pittsburgh, Pa., a corporation of Pennsylvania
Filed Nov. 5, 1962, Ser. No. 235,286
5 Claims. (Cl. 117—215)

This application is a continuation-in-part of application Serial No. 5,958, filed February 1, 1960, and now forfeited.

The present invention relates to insulated electrical members and has particular reference to electrical members provided with inorganic insulation adapted for use at temperatures up to at least 500° C. The invention also relates to processes for treating electrical components by high temperature vacuum impregnation with specific glass compositions.

Recently, emphasis has been placed upon the development of insulation for electrical members which are capable of operating satisfactorily at temperatures up to at least 500° C. Insulation capable of withstanding such high temperatures is necessary because certain electrical members and components are employed in missiles and aircraft which operate at these temperatures.

In an effort to provide such insulation, certain inorganic insulating materials have been developed. Many of the recently developed inorganic insulating materials are satisfactory for certain uses. Notwithstanding, there still is a need for insulation which will withstand not only high temperatures but, in addition, high relative humidity conditions and salt spray. Such insulation, to be completely satisfactory, also should have excellent mechanical shock resistance and high impact resistance.

It is the object of the present invention to provide inorganic insulation for electrical members which is suitable for operating at temperatures of 500° C. and higher and which will withstand mechanical shock and repeated impacts and which has high relative humidity resistance and high salt spray resistance.

Another object of the present invention is to provide a process for vacuum impregnating electrical components with certain molten glass compositions to provide electrical components with extremely high mechanical and electrical insulation resistance.

Other and further objects of the invention will, in part, be obvious and will, in part, appear hereinafter.

Figure 1:
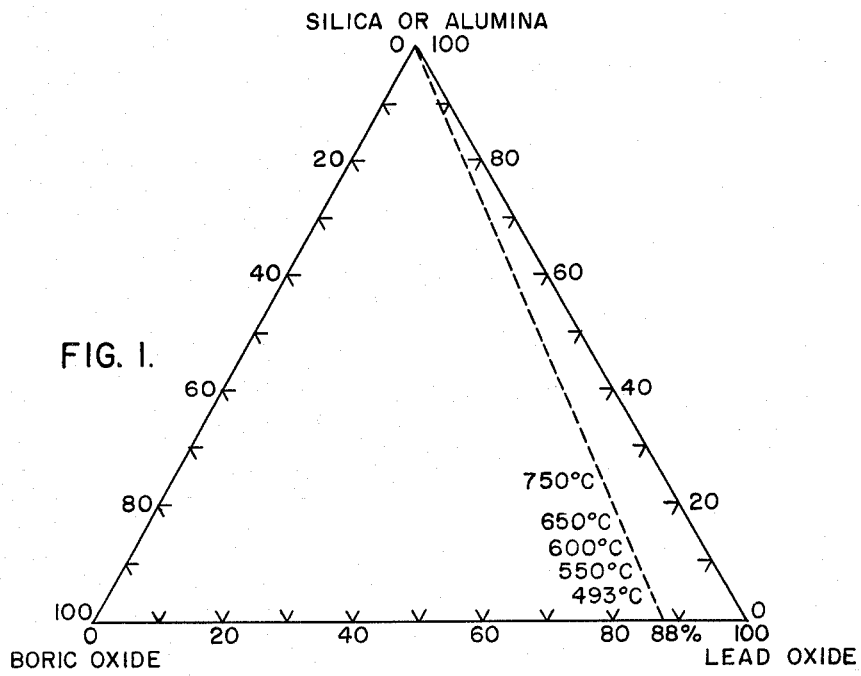
Figure 2:
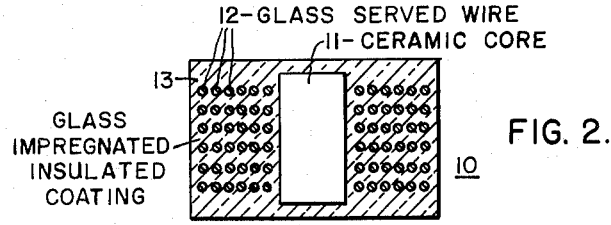

For a more complete understanding of the present invention reference is made to the following description taken in conjunction with the accompanying drawing, in which FIGURE 1 is a diagram of an insulating composition;
FIGURE 2 is a cross-sectional view of a coated electrical coil; and
FIGURE 3 is a process flow diagram.

Figure 3:
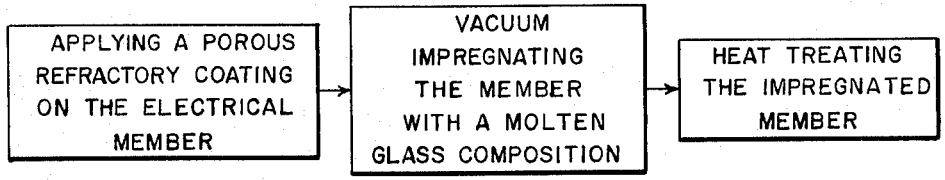

Broadly, in accordance with the present invention and in the attainment of the foregoing objects, there is provided a process which comprises the three steps illustrated in FIGURE 3 of the drawing.

First, providing, as by coating, potting, casting, or otherwise, electrical members with a covering of certain inorganic insulating materials. The coating must possess certain essential characteristics. Thus, it must be porous and it must comprise certain ingredients which are reactive with a later-to-be-applied glass impregnant composition.

Second, the member is vacuum impregnated at high temperatures with certain specific glass compositions. Since certain electrical conductors are corroded by some glasses at high temperatures, the glass chosen must be one which does not cause such corrosion at the temperatures employed. Also, the glass must be one which melts at a temperature such that the properties of annealed magnetic members are not adversely affected.

Third, the impregnated member is heat treated whereby the inorganic insulation, applied in the first step, dissolves in the impregnant to change the impregnant so as to improve the complete physical and electrical insulating properties of the complete insulation system.

Inorganic insulating materials which are applied to electrical members in the first step of the present invention comprise refractory oxides which, when admixed with the glass impregnant, provide a composition which has a higher viscosity at any given temperature than does the glass impregnant alone. Examples of suitable inorganic insulating materials include oxides of at least one material selected from the group consisting of aluminum, silicon, zirconium, magnesium, chromium, calcium, barium, zinc, lead, and titanium.

Glass impregnants which are suitable for use in accordance with this invention include those glasses which when molten have a viscosity of up to 100 poises. Such glasses included oxides of at least one material selected from the group consisting of lead, thallium, bismuth, antimony and arsenic. Glass compositions which have been found to be particularly satisfactory are those containing about 88%–50% lead oxide and about 12%–50% boric oxide, about 28%–61% lead oxide and about 72%–39% bismuth trioxide, and the like compositions, the proportions being by weight. Within these critical ranges the respective eutectics, containing 88% PbO-12% $B_2O_3$ and 55.3% PbO-44.7% $Bi_2O_3$ are preferred.

To illustrate the present invention more completely, small test coils were prepared. As illustrated in FIGURE 2, these coils 10 were bifilar wound on a ceramic core 11 one inch in diameter and one inch long with six layers of two glass-served number 21 AWG nickel-plated copper wire 12. The coils were provided with an impregnated inorganic insulating coating 13 by first vacuum impregnating them with a water suspension of one of two potting compounds. Coils #1 and #2 were coated with a composition having the following formula:

FORMULA I

| Material: | Parts by weight |
|---|---|
| 200 mesh zircon | 110 |
| 220 mesh fused aluminum oxide | 10 |
| 200 mesh lead-alumina-borosilicate glass | 5 |
| Water | 25 |

Coils #3 and #4 were coated with a composition having the following formula:

FORMULA II

| Material: | Parts by weight |
|---|---|
| 60 mesh zircon | 25 |
| 200 mesh zircon | 100 |
| 200 mesh fused aluminum oxide | 100 |
| 1000 mesh fused aluminum oxide | 100 |
| 200 mesh (88% PbO and 12% $B_2O_3$ glass) | 35 |
| Water | 80 |

Each of the two coils, one coated with Formula I and the other coated with Formula II, were fired to 650° C. and then vacuum impregnated with a molten glass at a temperature of 625° C. to provide the insulation 13 of FIGURE 2. The glass composition comprised 88% lead oxide and 12% boric oxide.

The impregnation was carried out in a high temperature impregnation apparatus consisting of two furnaces maintained within a vacuum tank. The upper furnace was an open ended, 5 inch diameter cylindrical muffle furnace. Directly beneath this furnace was another top-loading furnace containing the crucible for melting the impregnant. These furnaces were contained within a 22 inch diameter welded steel tank. The cover of the tank was sealed between a flange on the tank and the underside of the cover by means of a large O-ring. A glass observation window was provided in the cover. A one-half inch diameter stainless steel rod was provided to pass through a vacuum seal in the center of the cover. This rod was used for raising and lowering the electrical member to be impregnated from one furnace to the other. Cooling coils were installed beneath the outside of the tank flange and on the cover to maintain the gaskets cool. A controller device was used to control the temperature of the top furnace and a manually operated variac was used to regulate the power input to the lower furnace. The impregnation equipment was capable of operating at a temperature up to 800° C.

In impregnating the coils, each coil was secured to the movable stainless steel rod. The cover then was closed and the coil was lowered into the upper furnace for preheating. After the tank had been evacuated, the coil was lowered into and completely submerged in the molten impregnant maintained in the second furnace and then air was admitted to the tank. One minute was allowed for the impregnant to penetrate deeply into the inorganic insulation previously applied to the coils. The coils then were raised into the upper furnace and excess impregnant allowed to drip from the coils. Coils #1 and #3 were cooled and then tested. Coils #2 and #4 were baked at 500° C. for 16 hours and then tested. Specifically, the turn-to-turn insulation resistance of each coil was measured. The results are set forth in the following tables:

*Table I*

| Coils Insulated With Formula I | Insulation Resistance—Measured in Megohms | | | | |
|---|---|---|---|---|---|
| | Room Temp. | 200° C. | 300° C. | 400° C. | 500° C. |
| #1 Before aging | 13,500 | 1,700 | 13.5 | 0.205 | <0.08 |
| #2 After aging 16 hours at 500° C | >100,000 | 6,000 | 51.5 | 1.22 | <0.08 |

*Table II*

| Coils Potted With Formula II | Insulation Resistance—Measured in Megohms | | | | |
|---|---|---|---|---|---|
| | Room Temp. | 200° C. | 300° C. | 400° C. | 500° C. |
| #3 Before aging | >100,000 | 6,500 | 50 | 1.2 | <0.08 |
| #4 After aging 16 hours at 615° C | >100,000 | >100,000 | 8,000 | 70 | 3.3 |

Coils similar to those described above were prepared employing the refractory oxide of Formula I. The coils were preheated at 700° C. and then vacuum impregnated at 675° C. with a molten glass consisting of 55.3% by weight of PbO and 44.7% by weight of $Bi_2O_3$. The electrical properties of the coils so treated were comparable to those of the hereinbefore described coils.

To further demonstrate the improved results obtainable by the process of the present invention, actual transformer coils were prepared by a procedure similar to that described hereinabove with respect to the small test coils. In the transformer coil preparation, an alumina-glass composition was painted on each layer of the windings, to supply, initially, an inorganic insulation material capable of dissolving in the later-applied impregnant. The alumina-glass composition was as follows:

| | |
|---|---|
| 220 mesh aluminum oxide grams | 39 |
| 325 mesh glass—88% lead oxide, 12% boric oxide grams | 33 |
| 60 mesh zircon do | 15 |
| Cobalt oxide do | 0.2 |
| Water cc | 12 |

Two transformer test coils were thus prepared and tested in comparison with an untreated coil. Specifically, all three coils were subjected to the following five tests:

(1) Thermal shock by a direct transfer from 630° F. to −65° F.
(2) Mechanical shock of 30g's.
(3) Ozone test at 0.05% concentration.
(4) An altitude test of 80,000 feet.
(5) A vibration test of 20g's for two hours.

The two impregnated test coils passed all of the above tests whereas the unimpregnated coil did not. Similarly, prepared coils also were subjected to a relative humidity test, the results of which are shown in Table III.

*Table III.—Layer to layer resistance in test coils*

| Coil No. | 50% Relative Humidity at 23° C., ohms | 96% Relative Humidity at 30° C., ohms |
|---|---|---|
| No. 1—impregnated | $13 \times 10^7$ | $8 \times 10^6$ |
| No. 2—impregnated | $5 \times 10^7$ | $1.5 \times 10^6$ |
| No. 3—unimpregnated | $2 \times 10^4$ | $<1 \times 10^2$ |

As a still further test of coils prepared as described hereinabove, one coil was mounted on a core of magnetic steel laminations and subjected to vibrations of 42g's at resonance for a period of 42 hours. Even after this test, the coil still showed no visible signs of failure.

In FIGURE 1, there is shown a conventional composition diagram of a lead oxide-boric oxide glass impregnant and silica inorganic insulation system. Alumina may be substituted for the silica in the composition without a radical change occurring in the composition diagram. When the glass impregnant is heated to 600–700° C., the silica or alumina will dissolve therein. Thus, the composition changes along the direction of the dotted line shown on the drawing as more and more silica or alumina goes into solution in the glass impregnant phase. The resultant composition changes along the dotted line to a point dependent upon temperature and time.

As stated hereinbefore, it has been determined that the best glass impregnants to be used in accordance with the process of the present invention are the lead oxide-boric oxide eutectic (88% lead oxide and 12% boric oxide) and the lead oxide-bismuth trioxide eutectic (55.3% lead oxide and 44.7% bismuth trioxide). The lead oxide-boric oxide eutectic reaches a suitable fluidity for vacuum impregnation at 625° C. while the lead oxide-bismuth trioxide eutectic reaches a suitable fluidity at 675° C. However, mixtures containing as little as 50% PbO and as much as 50% $B_2O_3$, by weight, are completely satisfactory in carrying out the invention.

The silica, alumina or other refractory oxides may be applied to the electrical members being insulated during winding as an inner layer cooling coating and/or impregnated into the windings from a slurry, suspension or solution. Where only small quantities of the reactive materials are required, they may be applied to the wires before winding. The particular method of application decided upon depends upon the winding procedure, the physical configuration of the component, the temperature, and the electrical requirements of the insulation system.

Electrical components insulted in accordance with the process of the present invention have improved electrical and physical properties. In accordance with this process an insulation system is vacuum impregnated with a molten low melting glass which subsequently dissolves the refractory oxide insulation previously applied to an electrical member. A new composition results which has a higher softening point and higher volume resistivity than does the original glass impregnating composition. When applied to electrical components, such as transformer core and coil sets, solenoid coils, motor and generator stators, the finished units have greatly improved physical properties as well as good electrical properties.

While the present invention has been described with respect to what at present are considered to be preferred embodiments thereof, it will be understood, of course, that certain substitutions, modifications, changes, and the like may be made therein without departing from its true scope.

We claim as our invention:

1. A process for insulating an electrical member which comprises depositing on the member a porous inorganic insulating coating material, and then vacuum impregnating said coated electrical member with a molten glass composition having a viscosity of up to about 100 poises whereby said composition penetrates deeply into the interstices within the deposited coating to combine therewith and form on cooling a solid composite insulating body capable of withstanding temperatures of at least 500° C.

2. A process for insulating electrical members which comprises depositing on the member a porous inorganic insulating coating material, and then vacuum impregnating said coated electrical member with a molten glass composition having a viscosity of up to about 100 poises, said inorganic insulating coating material comprising at least one refractory oxide which, when mixed with the glass impregnant, provides a composition which has a higher viscosity at any given temperature than does the impregnating composition alone.

3. A process for insulating an electrical member which comprises depositing on the member a porous coating of an inorganic insulating material comprising at least one oxide of a material selected from the group consisting of aluminum, silicon, zirconium, magnesium, chromium, calcium, barium, zinc, lead, and titanium, and then vacuum impregnating said coated electrical member at a temperature of from about 500° C. to 800° C. with a molten glass composition having a viscosity of up to about 100 poises whereby said composition penetrates deeply into the interstices within the deposited coating to combine therewith and form on cooling a solid composite insulating body capable of withstanding temperatures of at least 500° C.

4. A process for insulating an electrical member which comprises depositing on the member a porous coating of an inorganic insulating material comprising at least one oxide of a material selected from the group consisting of aluminum, silicon, zirconium, magnesium, chromium, calcium, barium, zinc, lead, and titanium, and then vacuum impregnating said coated electrical member at a temperature of from about 500° C. to 800° C. with a molten glass composition selected from the group consisting of (1) a lead oxide-bismuth trioxide composition containing, by weight, about 28–61% lead oxide and about 39–72% bismuth trioxide and (2) a lead-oxide-boric oxide composition containing, by weight, about 50–88% lead oxide and about 50–12% boric oxide.

5. A process for insulating an electrical member which comprises depositing on the member a porous coating of an inorganic insulating material comprising at least one oxide of a material selected from the group consisting of aluminum, silicon, zirconium, magnesium, chromium, calcium, barium, zinc, lead, and titanium, and then vacuum impregnating said coated electrical member at a temperature of from about 500° C. to 800° C. with a molten electric glass composition containing about 88% lead oxide and 12% boric oxide, by weight.

References Cited by the Examiner

UNITED STATES PATENTS

| 2,588,920 | 3/1952 | Green | 106—53 X |
| 2,844,693 | 7/1958 | Rigterink | 117—231 X |
| 2,916,388 | 12/1959 | Earl | 106—49 |

FOREIGN PATENTS

| 767,610 | 12/1952 | Germany. |
| 293,128 | 12/1953 | Switzerland. |

RICHARD D. NEVIUS, *Primary Examiner.*

W. L. JARVIS, *Assistant Examiner.*